US009861932B2

(12) United States Patent
Lee et al.

(10) Patent No.: US 9,861,932 B2
(45) Date of Patent: Jan. 9, 2018

(54) POLYMER MEMBRANE FOR GAS SEPARATION OR ENRICHMENT COMPRISING HYBRID NANOPOROUS MATERIAL, USES THEREOF, AND A PREPARATION METHOD THEREOF

(71) Applicant: KOREA RESEARCH INSTITUTE OF CHEMICAL TECHNOLOGY, Daejeon (KR)

(72) Inventors: U-Hwang Lee, Daejeon (KR); Jong San Chang, Daejeon (KR); Young Kyu Hwang, Daejeon (KR); You In Park, Daejeon (KR); Hye Rim Song, Daejeon (KR); Seung Eun Nam, Daejeon (KR); Do Young Hong, Yongin-si (KR); Sue Kyung Lee, Daejeon (KR); Kyung Ho Cho, Anseong-si (KR)

(73) Assignee: KOREA RESEARCH INSTITUTE OF CHEMICAL TECHNOLOGY, Daejeon (KR)

(*) Notice: Subject to any disclaimer, the term of this patent is extended or adjusted under 35 U.S.C. 154(b) by 0 days.

(21) Appl. No.: 14/959,152

(22) Filed: Dec. 4, 2015

(65) Prior Publication Data

US 2016/0158708 A1  Jun. 9, 2016

(30) Foreign Application Priority Data

Dec. 5, 2014 (KR) .................. 10-2014-0174430

(51) Int. Cl.
*B01D 53/22* (2006.01)
*B01D 69/12* (2006.01)
(Continued)

(52) U.S. Cl.
CPC .......... *B01D 53/22* (2013.01); *B01D 53/228* (2013.01); *B01D 67/0079* (2013.01);
(Continued)

(58) Field of Classification Search
CPC ............... B01D 53/22; B01D 53/228; B01D 2053/221; B01D 67/0079; B01D 69/02;
(Continued)

(56) References Cited

U.S. PATENT DOCUMENTS

| 2008/0141858 | A1* | 6/2008 | Liu ............... | B01D 53/228 95/45 |
| 2011/0138999 | A1* | 6/2011 | Willis ............ | B01D 53/228 95/45 |

(Continued)

OTHER PUBLICATIONS

Ren, Huiqing et al., "Affinity between Metal-Organic Frameworks and Polyimides in Asymmetric Mixed Matrix Membranes for Gas Separations", Ind. Eng. Chem. Res., Jul. 2012, 51, pp. 10156-10164.*

(Continued)

*Primary Examiner* — Jason M Greene
(74) *Attorney, Agent, or Firm* — Norton Rose Fulbright US LLP

(57) ABSTRACT

Disclosed herein is polymer membrane for gas separation or concentration which contains a hybrid nanoporous material, an application thereof, and a manufacturing method thereof. Especially, the hybrid nanoporous material has a window size of 4 Å to 15 Å or has gas adsorption characteristics for a gas to be separated, which is different from those for other gases, and thus the present invention may provide the polymer membrane having improved gas permeation selectivity, an application thereof, and a manufacturing method thereof.

14 Claims, 7 Drawing Sheets

(51) Int. Cl.
  *B01D 69/14* (2006.01)
  *B01J 20/28* (2006.01)
  *B01J 20/26* (2006.01)
  *B01J 20/22* (2006.01)
  *B01D 67/00* (2006.01)
  *B01D 69/02* (2006.01)

(52) U.S. Cl.
  CPC .......... *B01D 69/02* (2013.01); *B01D 69/148* (2013.01); *B01J 20/226* (2013.01); *B01J 20/262* (2013.01); *B01J 20/28033* (2013.01); *B01D 2053/221* (2013.01); *B01D 2256/10* (2013.01); *B01D 2256/12* (2013.01); *B01D 2256/16* (2013.01); *B01D 2256/22* (2013.01); *B01D 2256/245* (2013.01); *B01D 2257/102* (2013.01); *B01D 2257/104* (2013.01); *B01D 2257/108* (2013.01); *B01D 2257/2047* (2013.01); *B01D 2257/30* (2013.01); *B01D 2257/504* (2013.01); *Y02C 10/10* (2013.01)

(58) Field of Classification Search
  CPC .......... B01D 69/148; B01D 2256/10; B01D 2257/30; B01J 20/226; B01J 20/262; B01J 20/28033
  See application file for complete search history.

(56) References Cited

U.S. PATENT DOCUMENTS

| | | | |
|---|---|---|---|
| 2012/0077019 A1* | 3/2012 | Knoben | B01D 67/0079 428/318.4 |
| 2016/0083254 A1* | 3/2016 | Lim | B01D 53/22 95/47 |
| 2016/0263533 A1* | 9/2016 | Odeh | B01D 71/64 |

OTHER PUBLICATIONS

Park et al., *Science* (2007) vol. 318, No. 5848, 254-258.
Bao, et al., *Langmuir* (2011), 27, 13554-13562.
Lee, et al., *Journal of the American Chemical Society* (2011), 133, 5228-5231.
Plaza, et al., *Separation and Purification Technology* (2012), 90, 109-119.
Ferreira, et al., *Chemical Engineering Journal* (2011), 167, 1-12.
Ferey, et al., *Angew. Chem. Int. Ed.* (2004) 43: 6296-6301.
Ferey, et al., *Science* (2005) 309: 2040-2042.
Caskey, et al.., *J. Am. Chem. Soc.* (2008) 130: 10870-10871.
Horcajada, et al., *Chem. Commun.* (2007) 2820-2822.
Reinsch, et al., *Dalton Trans.* (2013), 42, 4840-4847.
Reinsch, et al., *Chem. Mater.* (2013), 25, 17-26.
Song, et al., Membrane Journal, (2013) vol. 23, No. 6, 432-438. (with English abstract).

* cited by examiner

[FIG. 1]
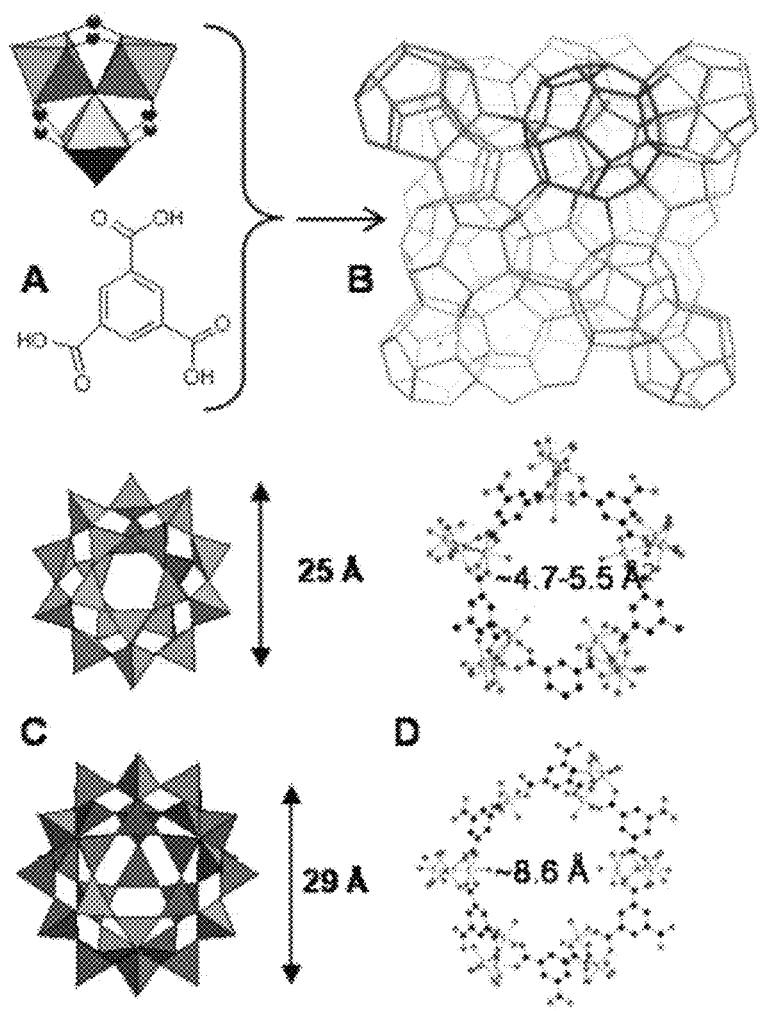

[FIG. 2]
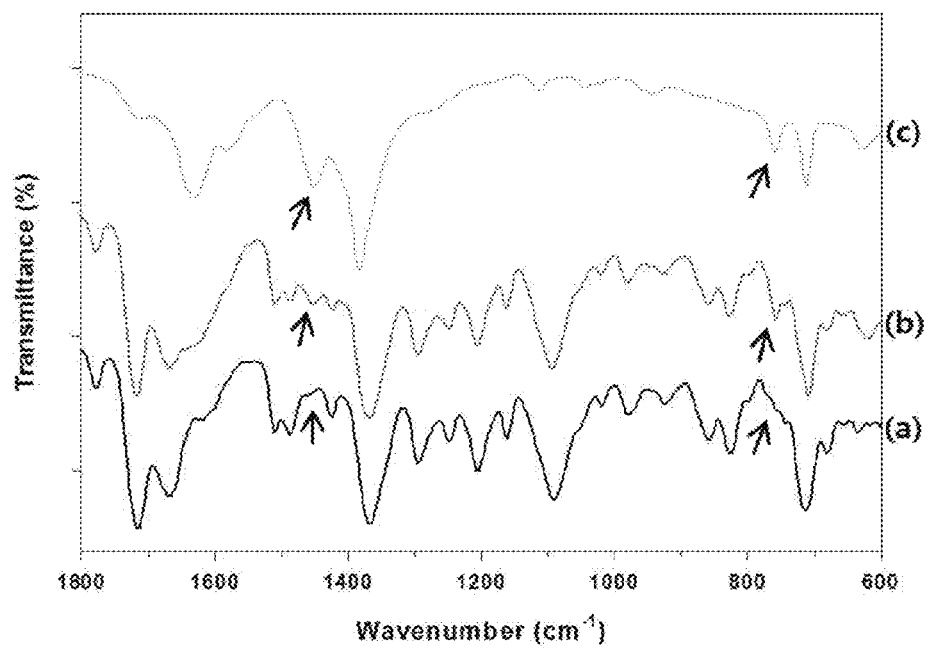

[FIG. 3]
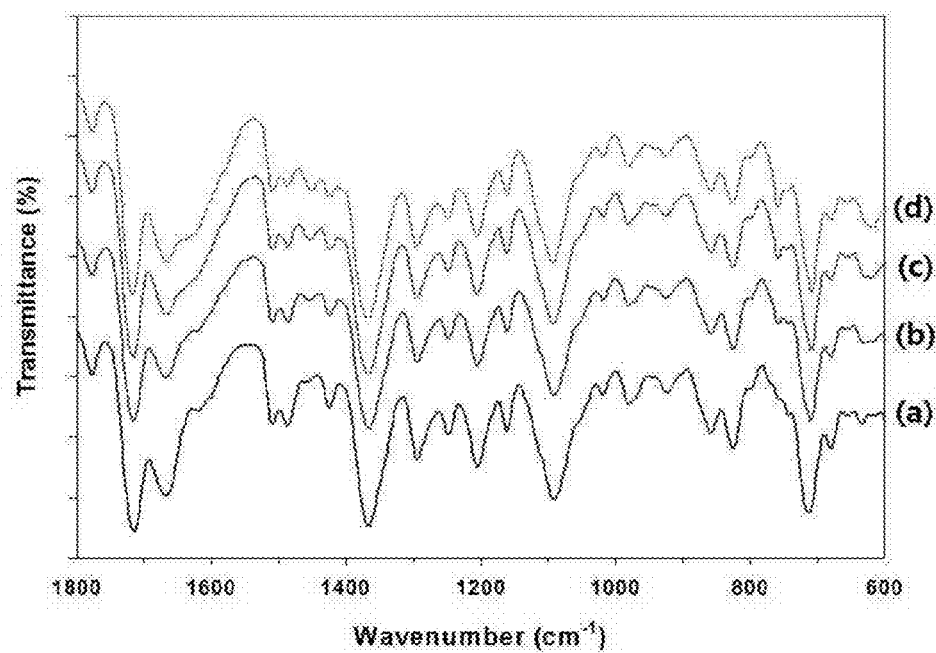

[FIG. 4]
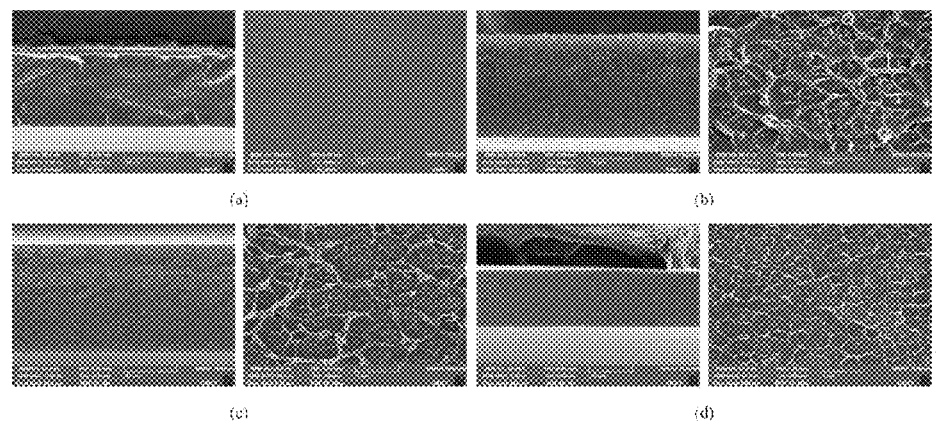
[FIG. 5]
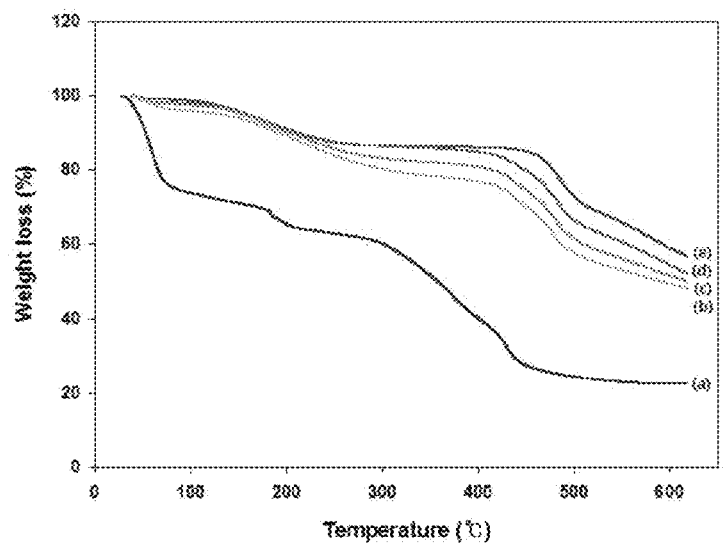

[FIG. 6]
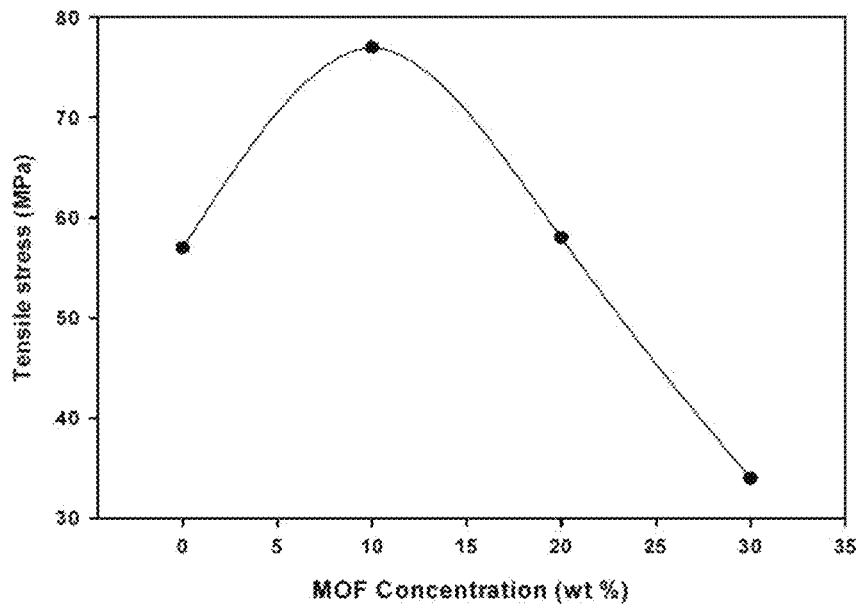
[FIG. 7]
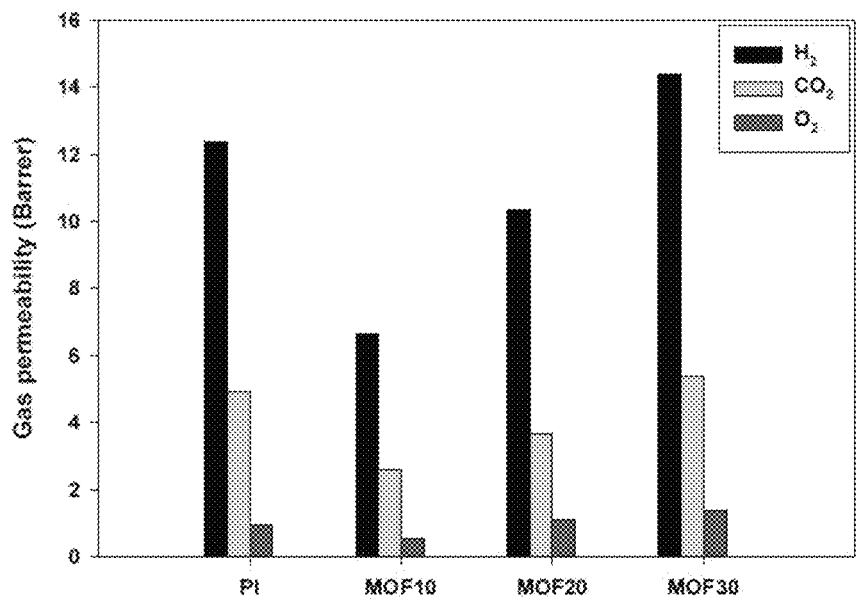

[FIG. 8]
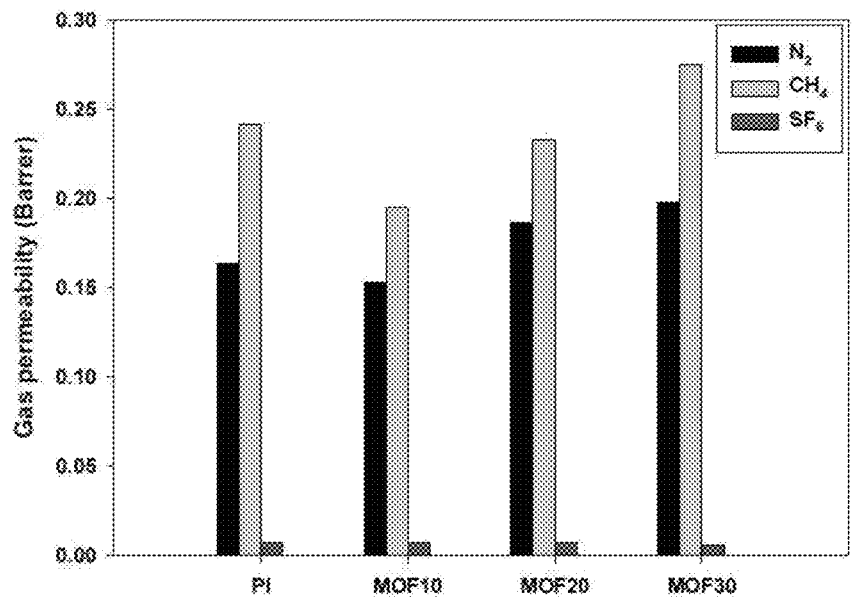
[FIG. 9]
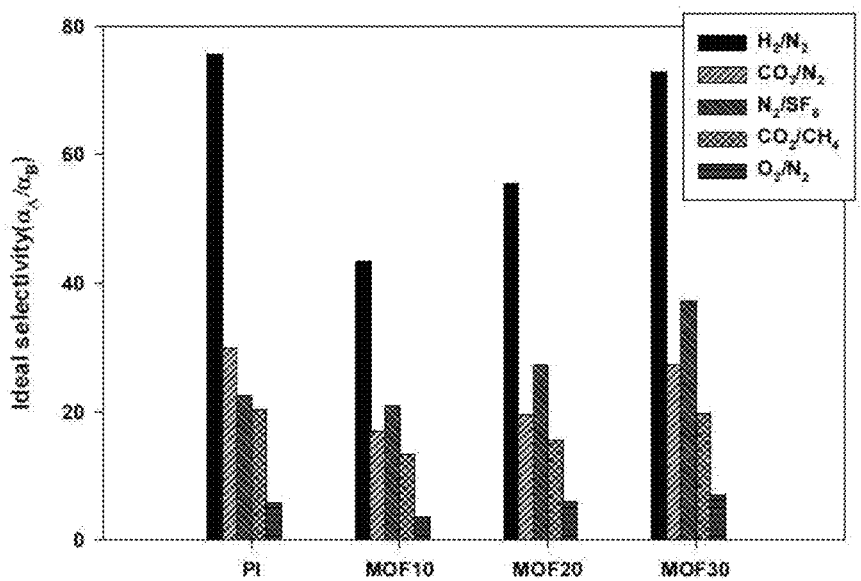

[FIG. 10]
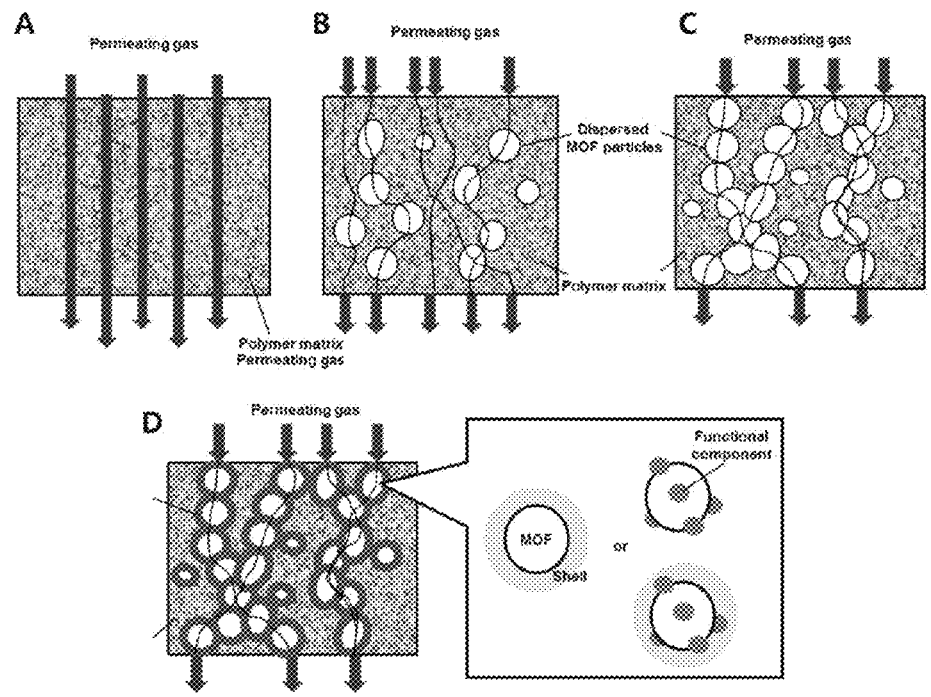
[FIG. 11]
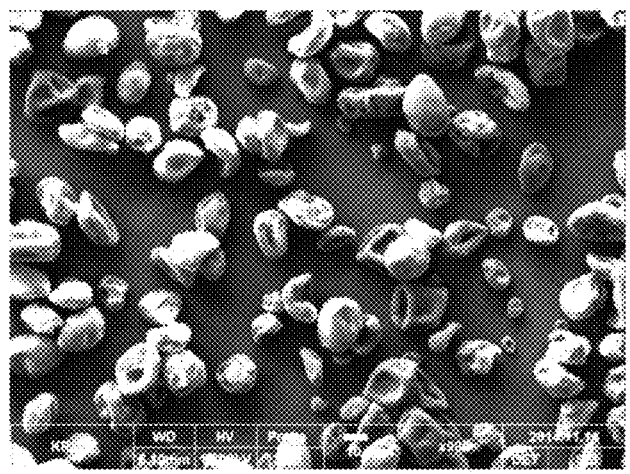

POLYMER MEMBRANE FOR GAS SEPARATION OR ENRICHMENT COMPRISING HYBRID NANOPOROUS MATERIAL, USES THEREOF, AND A PREPARATION METHOD THEREOF

CROSS-REFERENCE TO RELATED APPLICATIONS

This application claims the benefit of Korean Patent Application No. 10-2014-0174430, filed Dec. 5, 2014. The contents of the referenced application are incorporated herein by reference.

BACKGROUND OF THE INVENTION

Technical Field

The present invention relates to a polymer membrane for separation or concentration of gas, which contains a hybrid nanoporous material, an application thereof, and a manufacturing method thereof.

Background Art

A separation technology using a membrane is generally used in the separation process of liquid and gas because its principle and process are relatively simple and its application range is wide. In the separation technology, recently, a gas separation technology has been mostly studied because it can obtain economic effects, such as energy consumption reduction and operation cost reduction, compared to conventional gas separation methods, such as liquid distillation, extraction, and adsorption. Particularly, a polymer membrane has an advantage of being able to selectively separate a specific gas from a gas mixture according to the difference between permeation rate and dissolution rate of various gas molecules. However, despite such an advantage, currently-known polymer material for membrane does not exceed the line called "upper bound" due to the limitation in permeability and selectivity. Therefore, it is expected that it is difficult for this polymer membrane to surpass the performance of conventional commercially-available membranes as long as the performance of this polymer membrane is not improved. Generally, all polymer materials show a trade-off phenomenon, which is a very typical phenomenon in the field of membrane separation, and in which selectivity decreases with the increase of permeability, whereas selectivity increases with the decrease of permeability.

Recently, in order to solve such problems, many studies for membrane materials have been conducted. Among them, as a polymer membrane, a thermally-rearranged polymer shows a performance exceeding the upper bound in the separation of $CO_2/CH_4$ (H. B. Park et al., Science, 2007, 318, 254). Further, in order to overcome the limitations of polymer materials, studies for inorganic membranes using inorganic materials and mixed-matrix membranes (MMMs) using mixtures of polymers and inorganic materials have also been actively conducted.

Meanwhile, sulfur hexafluoride ($SF_6$), although harmless to humans, is a gas for accelerating the global warming, and has been widely used as an insulating material since the 1960s. This gas is a gas to cause an artificial greenhouse effect. Although the usage of this gas was not much, the demand thereof has recently increased. Sulfur hexafluoride ($SF_6$) is a major greenhouse gas together with carbon dioxide, HFCs, and PFCs. Sulfur hexafluoride ($SF_6$) is a greenhouse gas discharged during a semiconductor or LCD process, and the influence of sulfur hexafluoride ($SF_6$) on the global warming leads to 23,900 times that of carbon dioxide ($CO_2$) on the global warming.

Recently, a unit process technology for a recycling technology through a low-concentration gas separation and concentration system for semiconductor and display has been developed. A technology for treating low-density sulfur hexafluoride ($SF_6$) includes the steps of: pretreating a gas discharged at a low concentration (0.5% or lower) by nitrogen dilution after using sulfur hexafluoride ($SF_6$) in etching and cleaning in semiconductor and display industries; concentrating the pretreated gas through adsorption and membrane; and supplying the concentrated gas to a purification and concentration apparatus for producing high-concentration gas (95% or higher). Therefore, this technology is expected to be proposed as a regulation response technology in the fields of semiconductor and display as nation' major industries because a large amount of $SF_6$ gas discharged at a low concentration is concentrated at a high concentration, so as to finally recycling the $SF_6$ gas.

Under such circumstances, the present inventors have studied in order to manufacture a polymer membrane for gas separation or concentration, which has excellent gas separation performance capable of selectively separating a specific from various gas mixtures or concentrating the specific gas.

DISCLOSURE

Technical Problem

As a result, they found that, in the polymer membrane including a polymer matrix and a hybrid nanoporous material, gas permeation selectivity can be controlled by adjusting the window size, content or adsorption force of the hybrid nanoporous material to adjust the gas permeation rate of the polymer matrix and the hybrid nanoporous material. Based on the findings, the preset invention has been completed.

Accordingly, the present invention has been devised to solve the above-mentioned problems, and an object of the present invention is to provide a polymer membrane for gas separation or concentration, which has excellent gas permeation selectivity.

Another object of the present invention is to provide a method of separating a specific gas from a gas mixture or concentrating the specific gas using the polymer membrane for gas separation or concentration.

Still another object of the present invention is to provide a method of manufacturing the polymer membrane for gas separation or concentration.

Technical Solution

A first aspect of the present invention provides A polymer membrane for separating or concentrating a first gas or a second gas from a gas mixture including the first gas having a first monomolecular size V1 and the second gas having a second monomolecular size V2 (V1≠V2), the polymer membrane comprising:

a polymer matrix; and particles of hybrid nanoporous material dispersed in the polymer matrix, wherein the polymer matrix in the polymer membrane permeates the first gas and the second gas at different rates, and the hybrid nanoporous material has window size or adsorption characteristics for permeating the first gas, not the second gas.

A second aspect of the present invention provides a polymer membrane for gas separation or concentration, including: a hybrid nanoporous material, wherein the hybrid nanoporous material has a window size of 4 Å to 15 Å or has gas adsorption characteristics for a gas to be separated, which is different from those for other gases.

A third aspect of the present invention provides a method of preparing a first gas or a second gas, in which the first gas or the second gas is separated or concentrated from a gas mixture including the first gas having a first monomolecular size V1 and the second gas having a second monomolecular size V2 (V1≠V2) using a polymer membrane comprising a polymer matrix and particles of hybrid nanoporous material dispersed therein, wherein the polymer matrix in the polymer membrane permeates the first gas and the second gas at different rates, and the hybrid nanoporous material has window size or adsorption characteristics for permeating the first gas and not permeating the second gas.

A fourth aspect of the present invention provides a method of separating or concentrating a gas using the polymer membrane of the first aspect or the second aspect, wherein one or more single gas of two gases is separated or concentrated from a gas mixture including two gases selected from the group consisting of $CO_2/N_2$, $H_2/CO_2$, $O_2/N_2$, and $N_2/SF_6$.

A fifth aspect of the present invention provides a method of separating or concentrating $SF_6$ from a gas mixture including $SF_6$ using the polymer membrane of the first aspect or the second aspect.

A fifth aspect of the present invention provides a method of manufacturing the polymer membrane for gas separation or concentration according to the second aspect, including the steps of: (1) dispersing a hybrid nanoporous material in a solvent, the hybrid nanoporous material having a window size of 4 Å to 15 Å or having gas adsorption characteristics for a gas to be separated, which is different from those for other gases, so as to obtain a hybrid nanoporous material dispersion; (2) mixing the hybrid nanoporous material dispersion with a polymer to obtain a polymer solution; and (3) forming the polymer solution to obtain a polymer membrane.

Advantageous Effects

The present invention provides a polymer membrane containing hybrid nanoporous material for separation or concentration of gas, wherein the hybrid nanoporous material has a window size of 4 Å to 15 Å or adsorption characteristics of the hybrid nanoporous material is controlled, and thus may provide the polymer membrane having improved gas permeation selectivity.

DESCRIPTION OF DRAWINGS

The above and other objects, features and advantages of the present invention will be more clearly understood from the following detailed description taken in conjunction with the accompanying drawings, in which:

FIG. 1 shows the structures of MIL-100(Fe) used as a hybrid nanoporous material in the present invention, in which A shows the structures of an iron octahedral trimer and trimesic acid, B shows the structure of one unit cell of the MIL-100(Fe), C shows the two types of cages in the polyhedral mode, and D shows the structures of pentagonal and hexagonal windows represented by balls and rods;

FIG. 2 shows the FT-IR spectra of (A) polyimide membrane, (B) mixed-matrix membrane, and (C) hybrid nanoporous material powder;

FIG. 3 shows the FT-IR spectra of (A) polyimide membrane, (B) mixed-matrix membrane containing 10 wt % of a hybrid nanoporous material, (C) mixed-matrix membrane containing 20 wt % of a hybrid nanoporous material, and (D) mixed-matrix membrane containing 30 wt % of a hybrid nanoporous material;

FIG. 4 shows the sectional images of (A) polyimide membrane, (B) mixed-matrix membrane containing 10 wt % of a hybrid nanoporous material, (C) mixed-matrix membrane containing 20 wt % of a hybrid nanoporous material, and (D) mixed-matrix membrane containing 30 wt % of a hybrid nanoporous material;

FIG. 5 shows the TGAs of (A) hybrid nanoporous material powder, (B) mixed-matrix membrane containing 10 wt % of a hybrid nanoporous material, (C) mixed-matrix membrane containing 20 wt % of a hybrid nanoporous material, (D) mixed-matrix membrane containing 30 wt % of a hybrid nanoporous material, and (E) polyimide membrane;

FIG. 6 shows the measurement results of tensile strength of a mixed-matrix membrane according to the content of a hybrid nanoporous material;

FIG. 7 shows the measurement results of $H_e$, $CO_2$, and $O_2$ permeability of a mixed-matrix membrane according to the content of a hybrid nanoporous material;

FIG. 8 shows the measurement results for permeability of $N_2$, $CH_4$, and $SF_6$ of a mixed-matrix membrane according to the content of a hybrid nanoporous material;

FIG. 9 shows the measurement results of mixed gas selectivity of a mixed-matrix membrane according to the content of a hybrid nanoporous material;

FIG. 10 schematically show the gas permeation paths of (A) pure polymer matrix, (B) mixed-matrix membrane containing a hybrid nanoporous material in a low content, (C) mixed-matrix membrane containing a hybrid nanoporous material in a high content, and (D) mixed-matrix membrane containing a hybrid nanoporous material modified or added with a different organic or inorganic material; and FIG. 11 is an electron microscopy of a hybrid nanoporous material@polymer complex (Al-MOF@PS) having a core-shell structure.

BEST MODE

Hereinafter, the present invention will be described in detail.

A polymer membrane for gas separation and gas concentration has an advantage of being able to selectively separate a specific gas from a gas mixture or concentrating the specific gas according to the difference in permeation rate between various gas molecules. However, generally, polymer membrane materials show a trade-off phenomenon, which is a very typical phenomenon in the field of membrane separation, and in which selectivity decreases with the increase of permeability, whereas selectivity increases with the decrease of permeability. The most preferable polymer membrane material for gas separation or concentration must exhibit both high permeability and high selectivity.

The present invention is based on the finding that, in a polymer membrane, which separate or concentrates a first gas or a second gas from a gas mixture including the first gas having a first monomolecular size V1 and the second gas having a second monomolecular size V2 (V1≠V2), hybrid nanoporous material are dispersed in a polymer matrix, the polymer matrix permeates the first gas and the second gas at different rates, and the hybrid nanoporous material has window size or adsorption characteristics for permeating the first gas and not permeating the second gas (refer to FIG. 10(C)).

Here, the content of the hybrid nanoporous material in the polymer membrane for gas separation or concentration is within a range of the hybrid nanoporous material being connected with each other to form a continuous or discontinuous channel, and thus the difference of permeation rate between the first gas and the second gas in the polymer membrane may be larger than that of permeation rate between the first gas and the second gas in a polymer membrane for gas separation or concentration, in which hybrid nanoporous material are not dispersed (refer to FIG. 10(C)).

Since the structure for forming a channel is changed according to the number of hybrid nanoporous material particles, or the concentration or content of dispersed hybrid nanoporous material, gas permeability or gas separability can be influenced thereby. Further, the performance of the final membrane can be influenced according to the size of hybrid nanoporous material particles.

Further, the present invention provides a polymer membrane for gas separation or concentration having improved gas permeation selectivity, including a hybrid nanoporous material, in which the hybrid nanoporous material has a window size of 4 Å to 15 Å or has gas adsorption characteristics for a gas to be separated, which is different from those for other gases.

The performance (e.g. separation characteristics) of the polymer membrane for gas separation or concentration including the hybrid nanoporous material can be adjusted according to the size of hybrid nanoporous material particles of several tens of nanometers (nm) to several hundreds of micrometers (μm) as well as the kind of hybrid nanoporous material. For example, the connection structure or dispersion degree of hybrid nanoporous material particles can be adjusted according to the size of hybrid nanoporous material particles even though the content of hybrid nanoporous material is constant.

A gas separation membrane manufactured by dispersing microparticles or nanoparticles, such as zeolite, carbon molecular sieve, or carbon nanotube, in a polymer matrix for the purpose of improving physical properties or formability cab exhibit excellent gas separation performance by using two materials having different properties from each other.

Particularly, in the present invention, a gas separation membrane having excellent performance can be manufactured by preparing a mixed matrix membrane by mixing a hybrid nanoporous material with a polymer matrix. The hybrid nanoporous material used in the present invention has a surface area of 6500 $m^2/g$ or more, and has a large surface area, pore volume and adsorption amount, which are 3 to 15 times those of zeolite. The hybrid nanoporous material is remarkably different from zeolite commonly used as an inorganic material in that this hybrid nanoporous material has a coordinately-unsaturated site (CUS) not existing in a general inorganic nanoporous material to exhibit adsorption selectivity for specific gas, and thus skeletal elasticity or flexibility for expanding or contracting a pore structure according to the adsorption of external gas and liquid molecules, and functionality of metal skeleton ions and ligand are provided.

The adsorption and separation characteristics of the hybrid nanoporous material for various gases were known. For example, the individual adsorption isotherm results of ethane, ethylene, propane, and propylene were introduced in order to suppose the possibility of olefin/paraffin adsorption and separation technologies (Langmuir, 2011, 27, 13554); the results of selective gas adsorption difference measured according to the time while flowing a gas mixture of propane/propylene was reported (Journal of the American Chemical Society, 2011, 133, 5228); particularly, it was reported that a copper-based hybrid nanoporous material had the highest adsorption rate of those of heretofore reported zeolite, active carbon, and other hybrid nanoporous material adsorbents (Separation and Purification Technology, 2012, 90, 109); and a propylene/propane/isobutene separation technology based on vacuum swing adsorption (VSA) and simulated moving bed (SMB) was reported (Chemical Engineering Journal, 2011, 167, 1).

Further, since the hybrid nanoporous material has a large surface area, large pore volume, uniform pore size and high metal content, it has been studied as an interesting material in various fields, such as carbon dioxide adsorption, hydrocarbon adsorption and separation, catalysts, and sensors. Further, the hybrid nanoporous material can serve a template material allowing a solvent to induce a crystal structure, unlike zeolite which needs an inorganic or organic template material in addition to a solvent in order to form a crystal structure. Moreover, the hybrid nanoporous material can have various skeletal structures through the change of organic ligands because ions for forming a skeletal structure are not limited.

As used herein, the term "membrane for gas separation or concentration" or "gas membrane" refers to a membrane used in separating and/or concentrating one or more gases from a gas mixture.

The polymer membrane of the present invention may have a window size of a hybrid nanoporous material or adsorption characteristics of a hybrid nanoporous material to specific gas, that is, may have excellent gas permeation selectivity according to the adsorption characteristics. Such adsorption characteristics, as described above, may be changed according to the kind and size of a hybrid nanoporous material contained in the polymer membrane.

In the present invention, the gas separated or concentrated by the polymer membrane may be selected from the group consisting of hydrogen, oxygen, nitrogen, carbon dioxide, methane, and sulfur hexafluoride ($SF_6$).

As used herein, the terms "first monomolecular size V1" and "second monomolecular size V2" refer to a size of a first monomolecular gas and a size of a second monomolecular gas, respectively, and each represents a kinetic molecular size of each gas molecule.

As used herein, the terms "kinetic molecular size" refers to a molecular size calculated based on molecular dynamics. Molecular dynamics refers to a method of numerically solving Newton's equations of motion at a level of atomic or similar molecular model. That is, molecular dynamics refers to a work to find out the positions of all the atoms in a molecule as a function of time. Molecular dynamics is also used in theoretic simulation for an ideal molecular structure that is not substantially experimentally made. With the advance of theoretical physics, recently, molecular dynamics has widely been applied in the fields of material science, life science, and the like.

Specifically, the kinetic molecular size of hydrogen gas ($H_2$) is 2.89 Å, the kinetic molecular size of oxygen gas ($O_2$) is 3.46 Å, the kinetic molecular size of nitrogen gas ($N_2$) is 3.64 Å, the kinetic molecular size of carbon dioxide ($CO_2$) is 3.3 Å, the kinetic molecular size of methane gas ($CH_4$) is 3.8 Å, and the kinetic molecular size of sulfur hexafluoride ($SF_6$) is 5.12 Å.

As used herein, the term "hybrid nanoporous material" is a porous organic or inorganic polymer compound having a one-dimensional, two-dimensional or three-dimensional structure formed by the coordinate bonding of a central metal ion and an organic ligand, and refers to a crystalline compound containing both organic and inorganic materials in a skeletal structure and having a pore structure of molecular size or nanometer size. The hybrid nanoporous material is referred to as an organic-inorganic hybrid nanoporous material, a porous coordinated polymer, or an organic-inorganic hybrid material. The hybrid nanoporous material may contain both organic and inorganic materials in a skeletal structure. For example, the hybrid nanoporous material may have both hydrophilicity and hydrophobicity because polar metal ions and carboxylic acid anions and non-polar ligand aromatic compound coexist in the crystalline skeleton.

The organic-inorganic hybrid nanoprous material, so called metal-organic framework (MOF), began to be newly developed by the combination of molecular coordinate bond and material science, and has recently been actively studied because it has a large surface area, a large molecular size and nanosized pores to be applied to an adsorbent, a gas storage material, a sensor, a membrane, a functional film, a drug delivery material, a catalyst, and a catalyst support, and it can be used to collect guest molecules having a smaller size then pore size or separate molecules according to the size of molecules. Further, the hybrid nanoporous material is generally used to adsorb a material or support the material in pores and transfer the material because it has an advantage of providing a large surface area due to nanosized pores.

In the present invention, non-restrictive examples of the hybrid nanoporous material may be represented by Chemical Formulae 1 to 5 below.

[Chemical Formula 1]
$M_3X(H_2O)_2O[C_6Z_{4-y}Z'_y(CO_2)_2]_3$ (M=Fe, Mn, Cr, V, Nb, Ta, Al, W, or Mo; X=Cl, Br, I, F, or OH; Z or Z'=H, $NH_2$, Br, I, $NO_2$, or OH; $0 \leq y \leq 4$);

[Chemical Formula 2]
$M_3O(H_2O)_2X[C_6Z_{3-y}Z'_y(CO_2)_3]_2$ (M=Fe, Mn, Cr, V, Nb, Ta, Al, W, or Mo; X=Cl, Br, I, F, or OH; Z or Z'=H, $NH_2$, Br, I, $NO_2$, or OH; $0 \leq y \leq 3$);

[Chemical Formula 3]
$M_3O(H_2O)_2X_{1-y}(OH)_y[C_6H_3(CO_2)_3]_2$ (M=Fe, Mn, Cr, V, Nb, Ta, Al, W, or Mo; X=Cl, Br, I, or F; $0 \leq y \leq 1$);

[Chemical Formula 4]
$M_3X_{1-y}(OH)_y(H_2O)_2O[C_6H_4(CO_2)_2]_3$ (M=Fe, Mn, Cr, V, Nb, Ta, Al, W, or Mo; X=Cl, Br, I, or F; $0 \leq y \leq 1$); and

[Chemical Formula 5]
$M_aO_bX_cL_d$ (M is at least one metal ion selected from the group consisting of Ti, Zr, V, Cr, Nb, Ta, W, Mo, Fe, Co, Ni, Cu, Zn, Al, Mg, Ca, and Li; O is oxygen; X is at least one anionic ligand selected from the group consisting of $H^-$, $F^-$, $Cl^-$, $Br^-$, $NO_3^-$, $BF_4^-$, $PF_6^-$, $I^-$, $SO4^{2-}$, $HCO_3^-$, and $R_nCOO^-$ ($R_n$ is an alkyl group of $C_1$-$C_6$); L is at least one organic ligand selected from the group consisting of a carboxyl group (—COOH), a carboxylic acid anion group (—COO—), an amine group (—$NH_2$), an amino group (—NH), a nitro group (—$NO_2$), a hydroxyl group (—OH), a halogen group (—X), and a sulfonic acid group (—$SO_3H$); a is 1 to 12; b is 0 to 6; c is 0 to 12; and d is 1 to 12).

Non-restrictive examples of the hybrid nanoporous material are described in U.S. Pat. No. 5,648,508, and these references are incorporated herein. Specific examples thereof may include hybrid nanoporous materials named as MIL-100, MIL-101, MIL-102, MIL-110, MIL-125, MIL-125_$NH_2$, MIL-127, UiO-66, UiO-66_2COOH, (UiO-66-BTEC), UiO-66_COOH, UiO-66-BTC, and UiO-66_$NH_2$.

In the present invention, the metal ion of the hybrid nanoporous material may be selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ni^{2+}$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, and $Bi^+$, but is not limited thereto.

The hybrid nanoporous material containing the metal ion can be prepared by using an organic ligand constituting a general hybrid nanoporous material without limitation. Examples of the organic ligand may include, but are not limited to, 1,4-benzenedicarboxylic acid (BDCA), isophthalic acid, 1,3,5-benzenetricarboxylic acid (BTCA), 2,5-dihydroxyterephthalic acid, 2,5-dihyroxy-1,4-benzene dicarboxylic acid, 2-aminoterephthalic acid, 2-nitroterephthalic acid, 2-methylterephthalic acid, 2-haloterephthalic acid, azobenzene tetracarboxylic acid, 1,3,5-tri(4-carboxyphenyl)benzene, 2,6-naphthalene dicarboxylic acid (NDCA), benzene-1,3,5-tribenzoic acid (BTB), fumaric acid, glutaric acid, 2,5-furanedicarboxylic acid (FDCA), 1,4-pyridinedicarboxylic acid, 2-methylimidazole, alkyl-substituted imidazole, aromatic ring-substituted imidazole, 2,5-pyrazinedicarboxylic acid, 1,4-benzene dipyrazole, 3,5-dimethyl-pyrazolate-4-carboxylate, 4-(3,5-dimethyl-1H-pyrazol-4-yl)benzoate, 1,4-(4-bispyrazolyl)benzene, and derivatives thereof. Preferable examples thereof may include 1,4-benzenedicarboxylic acid, 1,3,5-benzenetricarboxylic acid, 2,5-dihydroxyterephthalic acid, 2,6-naphthalene dicarboxylic acid, azobenzene tetracarboxylic acid, and derivatives thereof, but is not limited thereto.

The hybrid nanoporous material used in the present invention may be a hybrid nanoporous material modified or added with a different organic or inorganic material after preparation in addition to the above-described hybrid nanoporous material. For example, in order to minimize the gaps or defects between hybrid nanoporous material and a polymer membrane, particles having a structure in which organic or inorganic material is added in the form of a core-shell can be used. Further, in order to increase the separation selectivity for a specific gas, nanoparticles, ionic material, or hybrid nanoporous material added with a functional group can be used (refer to FIG. 10D and FIG. 11).

Specifically, the core-shell type hybrid nanoporous material may include a hybrid nanoporous material core and a polymer shell. The polymer forming the shell can serves as a surfactant. For example, the polymer forming the shell may be a homopolymer, a copolymer, or a block copolymer. Specific examples of the polymer forming the shell may include, but are not limited to, polyoxyethylene, polyoxyethylene glycol, polyoxypropylene alkyl ether, polyoxypropylene monoalkyl ether, polyoxypropylene alkyl, polyoxyethylene tallowamine, polyoxyethylene oleylamine, polyoxyethylene stearylamine, polyoxyethylene laurylamine, polyoxyethylene sorbitan ester, polyoxyethylene octyl ether, polyoxyethylene glycerin ether, polysulfonic acid, polyacrylamine, polyoxyethylene-polyoxyethylene, polyoxyethylene-polyoxypropylene alkyl ether, polyoxyethylene-polyoxypropylene monoalkyl ether, polyoxyethylene-polyoxypropylene alkyl copolymer, polycaprolactone (PCL), polymethylmethacrylate (PMMA), polystyrene (PS), polyacrylonitrile (PAN), polyvinylidene fluoride (PVdF), polyethylene oxide (PEO), polyvinylpyrrolidone (PVP), polyacrylic acid (PAA), polyvinyl alcohol (PVA), polyacrylic acid, polymethacrylic acid, a polyacrylic acid-polymethacrylic acid copolymer, a polyacrylic acid-polyvinyl alcohol copolymer, a polymethacrylic acid-polyvinyl alcohol copolymer, a polyacrylic acid-polyethylene glycol copolymer, a polyacrylic acid-polypropylene glycol copolymers, a polymethacrylic acid-polyethylene glycol copolymer, a polymethacrylic acid-polypropylene glycol copolymer, a polyvinyl alcohol-polyethylene copolymer, and a polyvinyl alcohol-polypropylene glycol copolymer.

In the case of the mixed matrix membrane containing the core-shell type hybrid nanoporous material, compared to a conventional inorganic material-organic material mixed matrix membrane, the interfacial contact between polyimide constituting a polymer matrix and a polymer (e.g. PS) constituting a shell in the mixed matrix membrane remarkably increases, and thus the hybrid nanoporous material, which is a molecular sieve, can be highly dispersed in the polymer matrix in the mixed matrix membrane. This highly-dispersed mixed matrix membrane can be used in the separation of various gas mixtures, such as methane/carbon dioxide, nitrogen/oxygen, nitrogen/methane, and hydrogen/nitrogen/carbon dioxide.

As used herein, the term "window" refers to an open portion of the hybrid nanoporous material.

As described above, in the present invention, the hybrid nanoporous material having a window size of 4 Å to 15 Å is used, thereby increasing the permeability of gas, particularly, increasing the selectivity of sulfur hexafluoride ($SF_6$) at the time of gas separation.

The polymer membrane for gas separation or concentration according to the present invention may contain the hybrid nanoporous material in an amount of 10 wt % to 50 wt % based on the total weight of polymer membrane. The content of the hybrid nanoporous material is preferably 10 wt % to 30 wt % based on the total weight of polymer membrane, but is not limited thereto.

In the present invention, the polymer used in the matrix of the polymer membrane may be selected from the group consisting of polyimide, polyacetylene, cellulose acetate, polysulfone, polyethylene oxide, poly(4-methylpentene-1), poly(2,6-dimethyl-phenylene oxide), polydimethylsiloxane, polyethylene, polyvinylidene chloride, polytetrafluoroethylene oxide, polyacrylonitrile, poly (vinyl alcohol), polystyrene, and nylon 6, but is not limited thereto.

In the present invention, the polymer membrane can be used to separate or concentrate a single gas from various gas mixtures. Specifically, the polymer membrane can be used to separate or concentrate a single gas from a gas mixture including different gases selected from $CO_2/N_2$, $H_2/CO_2$, $O_2/N_2$, and $N_2/SF_6$.

In the polymer membrane of the present invention, with the increase of the content of the hybrid nanoporous material, the permeability of another gas increases, and the permeability of $SF_6$ decreases, so as to make the selectivity for $SF_6$ excellent. Therefore, this polymer membrane can be used to separate or concentrate $SF_6$ from a gas mixture including $SF_6$.

For example, when the content of the hybrid nanoporous material is adjusted to 20 wt % to 30 wt % based on the total weight of the polymer membrane, it is shown that a polymer membrane having improved gas selectivity for $SF_6$ can be provided (refer to FIG. 100). That is, when the hybrid nanoporous material having a window size of 4 Å to 15 Å is used in an amount of 20 wt % to 30 wt % based on the total weight of the polymer membrane, the permeability of sulfur hexafluoride ($SF_6$) decreases compared to that of another gas, thereby further increasing the selectivity for sulfur hexafluoride ($SF_6$).

The polymer membrane of the present invention may be a flat type or hollow fiber type polymer membrane.

The polymer membrane of the present invention may be a heat-treated or vacuum-treated polymer membrane. That is, in the present invention, the polymer membrane may be pretreated (heat-treated or vacuum-treated) before use. Through this pretreatment, the hybrid nanoporous material in the polymer membrane for gas separation or concentration is activated to improve the compactness of the hybrid nanoporous material or remove the defects thereof, thereby further improving the separation performance of the polymer membrane.

Meanwhile, the method of manufacturing the polymer membrane for gas separation or concentration according to the present invention may include the steps of: (1) dispersing a hybrid nanoporous material in a solvent, the hybrid nanoporous material having a window size of 4 Å to 15 Å or having gas adsorption characteristics for a gas to be separated, which is different from those for other gases, so as to obtain a hybrid nanoporous material dispersion; (2) mixing the hybrid nanoporous material dispersion with a polymer to obtain a polymer solution; and (3) forming the polymer solution to obtain a polymer membrane.

Preferably, the method of manufacturing the polymer membrane for gas separation or concentration according to the present invention may further include the step of: (4) heat-treating or vacuum-treating the polymer membrane after the step (3).

In the step (1), the hybrid nanoporous material is added to the solvent in an amount of 10 wt % to 50 wt % based on the total weight of the polymer membrane and dispersed in the solvent to obtain the hybrid nanoporous dispersion.

In the present invention, the solvent may be at least one selected from the group consisting of N-methyl-2-pyrrolidone, dioxane, dimethylacetamide, dimethylformamide, dimethyl sulfoxide, acetone, methyl ethyl ketone, r-butyrolactone, $C_{1-6}$ alcohol, ethyl acetate, and glycol ether, but is not limited thereto.

In the method of manufacturing the polymer membrane for gas separation or concentration according to the present invention, the kind of metal ions of the hybrid nanoporous material and the kind of organic ligands are the same as those described in the polymer membrane for gas separation or concentration.

In the method of the present invention, in the step (1), the dispersion of the hybrid nanoporous material in the solvent can be carried out by ultrasonic treatment, stirring, or a combination thereof, but is not limited thereto.

In the step (2), a polymer is mixed with the hybrid nanoporous material dispersion to obtain a polymer solution for manufacturing the polymer membrane for gas separation or concentration.

In the method of manufacturing the polymer membrane for gas separation or concentration according to the present invention, the kind of the polymer is the same as that described in the polymer membrane for gas separation or concentration.

In the step (3), the polymer solution is molded to obtain a polymer membrane for gas separation or concentration.

In the method of the present invention, in the step (3), the forming of the polymer solution may be carried out by knife casting, tape casting, spinning, dip coating, slip coating, spray coating, ultrasonic coating, or spin coating, but is not limited thereto.

Knife casting or tape casting may be performed by forming the polymer solution in the form of a film or a flat plate using a knife or tape and then removing the solvent by heating or the like.

Meanwhile, among the forming methods, spinning can be used to manufacture a hollow fiber type membrane, that is, a hollow cylindrical membrane, which is known as an efficient structure capable of providing a wide surface area. The hollow fiber type membrane may be an impermeable hollow fiber type membrane including an outer skin layer capable of permeating a gas and an inner skin layer having a lumen layer not capable of permeating gas, and may also be a hollow fiber type membrane having a hollow cylindrical shape. Preferably, the hollow fiber type membrane may be a hollow fiber type membrane having a backbone and surface formed in a hollow fiber shape by adding a hybrid nanoporous material to a material that is used to manufacture a conventional hollow fiber type membrane. This hollow fiber type membrane is characterized in that the inner skin layer forms an impermeable lumen layer and the outer skin layer does not permeate a gas. Therefore, cool water and hot steam can be alternately supplied to an empty space in the lumen layer, so that cool water can be used at the time of gas adsorption and hot steam can be used at the time of gas desorption. Further, the hybrid nanoporous material is applied to a membrane to form a hollow fiber type membrane, and the hollow fiber type membrane can be utilized in the separation, concentration or purification of a gas. For example, a polymer for membrane and a hybrid nanoporous material are mixed, and then dispersed in a solvent to manufacture a hollow fiber mixed matrix membrane (hollow fiber mixed matrix MOF membrane) by spinning, and this hollow fiber mixed matrix membrane can be effectively used in the separation of a gas using a membrane separation system configured by binding a large number of fiber bundles to form a cartridge type module, and, particularly, can be effectively used in the separation of sulfur hexafluoride, especially in semiconductor process.

In the step (4), the polymer membrane is heat-treated or vacuum-treated in order to improve the performance thereof.

The polymer membrane containing the hybrid nanoporous material for gas separation or concentration, as described above, requires pre-treatment and/or post-treatment in order to activate the hybrid nanoporous material or maximize the selectivity for gas in the procedure of preparation or usage. Such pre-treatment and/or post-treatment include heat-treatment or vacuum-treatment, and can influence the defects or compactness between hybrid nanoporous material and polymer particles.

In an embodiment of the present invention, in order to manufacture a membrane having higher gas permeation selectivity, a polymer membrane, as a mixed matrix membrane, was manufactured using various kinds of hybrid nanoporous materials. Further, in order to evaluate the physical and chemical properties of the polymer membrane according to the difference of additive amount in the case where MIL-100(Fe) is used as the hybrid nanoporous material, the FT-IR, TGA-DTA and gas permeation performance of the polymer membrane were evaluated. As a result, it was ascertained from FT-IR spectrum that peaks around 758 $cm^{-1}$ and 1,453 $cm^{-1}$, as IR spectrum, increase with the increase in the content of the hybrid nanoporous material, and thus it could be understood that the composition of the manufactured mixed matrix membrane is consistent with the IR spectrum.

Meanwhile, it could be ascertained that the gas permeability of the polymer membrane is lower than or equal to that of a polyimide membrane when the content of the hybrid nanoporous material is low, and the gas permeability of a mixed matrix membrane having a relatively high content of the hybrid nanoporous material is higher than that of the polyimide membrane. The reason for this is due to the results of the gas permeation path of the mixed matrix membrane different from that of a conventional polymer membrane, and is considered that the polymer membrane permeates gas molecules through a space between polymer chains, but the mixed matrix membrane has various gas permeation paths, thereby making an influence on the total gas permeability (refer to FIG. 10).

Further, it was ascertained that the permeability of $SF_6$ having a relatively large size (kinetic diameter: 5.5 Å) decreases with the increase in the additive amount of the hybrid nanoporous material. It was also ascertained that the $N_2/SF_6$ selectivity of the polymer membrane was increased by approximately 40% to that of a polyimide film, and thus this polymer film is suitable for $N_2/SF_6$ separation. Therefore, this polymer membrane can be applied to the $SF_6$ separation process used in the semiconductor and LDC manufacturing fields.

[MODE FOR INVENTION]

Hereinafter, the present invention will be described in more detail with reference to the following Examples. These Examples are set forth to illustrate the present invention, and the scope of the present invention is not limited to these Examples.

Preparation Example 1

Preparation of Hybrid Nanoporous Material MIL-100(Cr) Using Hydrothermal Synthesis Chromium metal and 1,3,5-benzenetricarboxylic acid (BTCA) were put into a 100 mL Teflon reactor, and then 48 g of water and 4 mL of HF were added to obtain a reactant mixture. Then, the reactant mixture in the Teflon reactor was stirred at room temperature, the Teflon reactor was mounted in an autoclave reactor, and then a crystallization reaction was performed by electric heating oven at 220° C. for 2 days. The sample was purified and dried to obtain a hybrid nanoporous material MIL-100(Cr). The X-ray diffraction spectrum for the obtained MIL-100(Cr) adsorbent powder was obtained using X-ray diffraction spectroscopy manufactured by Rigaku Corporation and Cu Kα beamline. The XRD pattern of the final product was confirmed to match the value disclosed the literature (Angew. Chem. Int. Ed., 43: 6296 (2004)).

Preparation Example 2

Preparation of Hybrid Nanoporous Material MIL-101(Cr) Using Hydrothermal Synthesis $Cr(NO_3)_3.9H_2O$ and 1,4-benzenedicarboxylic acid (BDCA) were put into a Teflon reactor. Then, the Teflon reactor filled with the reactant mixture was mounted in an autoclave reactor, and then a crystallization reaction was performed by electric heating oven at 220° C. for 8 hours. The sample was purified and dried to obtain a hybrid nanoporous material MIL-101(Cr). The XRD pattern of the final product was confirmed to match the value disclosed the literature (Science, 309: 2040 (2005)).

Preparation Example 3

Preparation of Hybrid Nanoporous Material CPO-27(Co) Using Microwave Synthesis $Co(NO_3)_2 \cdot 6H_2O$ and 2,5-dihydroxyterephthalate (DHT) were put into a Teflon reactor. Then, the Teflon reactor filled with the reactant mixture was mounted in a microwave reactor (Model Mars-5, manufactured by CEM Corporation), irradiated with microwaves (2.54 GHz) to 100° C., and then maintained for 1 hours to perform a crystallization reaction. The sample was purified and dried to obtain a hybrid nanoporous material CPO-27(Co). The XRD pattern of the final product was confirmed to match the value disclosed the literature (J. Am. Chem. Soc., 130: 10870 (2008)).

Preparation Example 4

Preparation of Hybrid Nanoporous Material MIL-100(Fe) Using Hydrothermal Synthesis Iron(III) nitrate ($Fe(NO_3)_3 \cdot 6H_2O$) and 1,3,5-benzenetricarboxylic acid (BTCA) were put into a Teflon reactor. Then, the Teflon reactor filled with the reactant mixture was maintained at 160° C. for 12 hours to perform a crystallization reaction. The sample was purified and dried to obtain a hybrid nanoporous material MIL-100(Fe). The XRD pattern of the final product was confirmed to match the value disclosed the literature (*Chem. Commun.*, 2820 (2007)).

Preparation Example 5

Preparation of Hybrid Nanoporous Material MIL-100(Cr/Fe) Using Microwave Hydrothermal Synthesis Chromium metal, iron nitrate, and 1,3,5-benzenetricarboxylic acid were put into a 100 mL Teflon reactor manufactured by CEM Corporation. Then, the reactant mixture in the Teflon reactor was stirred at room temperature for 30 minutes, put into a microwave oven MARS-5 manufactured by CEM Corporation, heated to 200° C. for 10 minutes by a power of 500 W, and then thermally synthesized to perform a crystallization reaction. The sample was purified and dried to obtain hybrid nanoporous material powder. The XRD pattern of the final product was the same as the XRD pattern of the MIL-100(Cr) obtained in Preparation Example 1. From this result, it was ascertained that a MIL-100(Cr/Fe) material containing chromium and iron ion in the backbone thereof was synthesized.

Preparation Example 6

Preparation of Al-based Hybrid Nanoporous Material CAU-10

For applications as an energy-saving water absorbent of a hybrid nanoporous material, an Al-based hybrid nanoporous material formed by bonding of Al and organic ligand isophthalic acid was prepared by a reaction at 100° C. for 12 hours through a solvent reflux device. The crystallinity of the Al-based hybrid nanoporous material prepared in this way was ascertained through X-ray diffraction. From the result, it can be understood that the Al-based hybrid nanoporous material has the same structure as CAU-10 known through the literatures "*Ref. Dalton Trans.*, 2013, 42, 4840" and "*Chem. Mater.* 2013, 25, 17". The surface area and pore volume thereof were measured through nitrogen adsorption isotherm ($S_{BET}$=635 m$^2$/g, $PV_{total}$=0.25 cm$^3$/g). It was confirmed by an electron microscope that the Al-based hybrid nanoporous material is a crystal having a size of 500 nm or less.

Preparation Example 7

Core-shell Structured Hybrid Nanoporous Material Modified with Polymer 0.6 g of polystyrene (PS) and 0.4 g of Al-Fumarate were dispersed in 14 g of tetrahydrofuran (THF) to prepare a core-shell structured hybrid nanoporous material.

Example 1

Manufacture of Mixed Matrix Membrane

Reagent and Material

In order to manufacture a mixed matrix membrane, polyimide (Matrimid® 5218) was used as a polymer matrix, and NMP (N-methyl-2-pyrrolidone, manufactured by SAMCHUN CHEMICAL CORPORATION) was used as a solvent.

Each of the hybrid nanoporous materials prepared in Preparation Examples 1 to 7 was used. FIG. 1 schematically shows the structure of MIL-100(Fe). The polymers and hybrid nanoporous materials having been used in experiments were dried and used, and all reagents were used without purification.

Manufacture of Mixed Matrix Membrane

A predetermined amount of the prepared hybrid nanoporous material (MOF) was dispersed in NMP for 24 hours or more by ultrasonic treatment and stirring, and then polyimide was added to prepare a solution. The composition ratio of the prepared solution is given in Table 1 below. The prepared solution was applied onto a horizontally-fitted glass plate using a casting knife. In this case, the casting knife was fixed at a height of 12.5 μm from the glass plate. In order to manufacture a non-porous membrane, a solvent was removed by a drying process using a solution casting method in an oven. The above process was carried out at room temperature under a humidity condition of 20% or less.

TABLE 1

| Sample name | Polyimide | NMP | MOF | weight percent* |
|---|---|---|---|---|
| PI |  |  | 0 | 0 |
| MOF10 | 20 | 80 | 2 | 10 |
| MOF20 |  |  | 4 | 20 |
| MOF30 |  |  | 6 | 30 |

*weight percent = $\dfrac{\text{MOF wt \%}}{\text{polymer wt \%}} \times 100$

Experimental Example 1

FT-IR Measurement of Mixed Matrix Membrane

The FT-IR spectra of the mixed matrix membrane manufactured in Example 1 was measured using a FT-IR spectrometer (Bruker Alpha-T, Germany) in order to determine the presence or absence of the functional group of the hybrid nanoporous material MIL-100(Fe).

The FT-IR spectra of the manufactured mixed matrix membrane according to the content of the hybrid nanoporous material added to the mixed matrix membrane are shown in FIGS. 2 and 3. FIG. 2(A) shows the IR spectrum of a pure polyimide membrane, in which the functional group of polyamide can be observed at 1,720 cm$^{-1}$ and 1,780 cm$^{-1}$ which are symmetric and asymmetric stretching peaks of C=O group in imide.

As shown in FIG. 2(B), it can be seen that the IR spectrum of the mixed matrix membrane was similar to that of the polyimide membrane. As shown in FIG. 3, it can be seen that, in the IR spectrum of the hybrid nanoprous material at approximately 758 cm$^{-1}$ and 1,453 cm$^{-1}$, the intensity of peaks was increased with the increase in the additive amount of the hybrid nanoporous material.

Experimental Example 2

SEM Analysis of Mixed Matrix Membrane

FE-SEM (TESCAN MIRA3, USA) was used in order to observe the structure of the mixed matrix membrane manufactured in Example 1 containing the hybrid nanoporous material MIL-100(Fe), and the measured samples were coated with platinum for 120 seconds and then analyzed.

FIG. 4 shows the structural characteristics of the polyimide membrane and the mixed matrix membrane. As shown in FIG. 4, it can be seen that a larger amount of hybrid nanoporous material exist in the polymer matrix with the increase of the content of the hybrid nanoporous material. Further, it can be seen that the viscosity of the prepared solution was increased with the increase of the additive amount of the hybrid nanoporous material, and thus the thickness of the membrane was increased. The thicknesses of the manufactured membranes are 35 μm, 34 μm, 48 μm, and 65 μm in order of polyimide membrane, mixed matrix membrane containing 10 wt % of hybrid nanoporous material, mixed matrix membrane containing 20 wt % of hybrid nanoporous material, and mixed matrix membrane containing 30 wt % of hybrid nanoporous material.

Experimental Example 3

TGA Analysis of Mixed Matrix Membrane

In order to observe the weight loss change of the mixed matrix membrane manufactured in Example 1 containing the hybrid nanoporous material MIL-100(Fe), the weight loss change thereof was measured using TGA Q5000 (TA Instruments, USA) while heating the mixed matrix membrane to 600° C. at a temperature increase rate of 10° C./min together with nitrogen ($N_2$).

FIG. 5 shows the TGAs of the hybrid nanoporous material powder, the polyimide membrane, and the mixed matrix membrane. According to the TGA curve of the hybrid nanoporous material powder, the first weight loss of the hybrid nanoporous material powder was caused by the moisture existing in the pores, and, in this case, the weight loss rate thereof was about 29.51%. Thereafter, the moisture existing together with trivalent iron ions ($Fe^{3+}$) at a temperature of 84° C. to 200° C. was reduced by 8.11%. The final weight loss thereof was caused by trimesic acid at 200° C. to 550° C., and, in this case, the weight loss rate thereof was 39.76%.

The thermal decomposition temperature of the polyimide membrane is about 480° C., and the polyimide membrane may be a polymer membrane having excellent thermal stability. With the increase of the additive amount of the hybrid nanoporous material, the thermal composition temperature of the mixed matrix membrane tends to be slightly decreased. The reason for this is inferred that thermal stability is deteriorated due to the mixing of the hybrid nanoporous material and the polymer.

Experimental Example 4

Analysis of Tensile Strength of Mixed Matrix Membrane

The tensile strength of the mixed matrix membrane manufactured in Example 1 containing the hybrid nanoporous material MIL-100(Fe) was used using a Series IX Automated Materials Testing System (Instron Corporation, USA) under conditions of a temperature of 25° C., a crosshead speed of 50 mm/min and a full scale load range of 10 kgf.

The tensile strength of the mixed matrix membrane according to the additive amount of the hybrid nanoporous material was measured. As shown in FIG. 6, it can be seen that, when the content of the hybrid nanoporous material was 10 wt %, the tensile strength of the mixed matrix membrane was about 1.3 times that of the membrane not containing the hybrid nanoporous material. Further, it can be seen that, when the content of the hybrid nanoporous material was 20 wt %, the tensile strength of the mixed matrix membrane was approximately equal to that of the membrane not containing the hybrid nanoporous material, and as soon as the content of the hybrid nanoporous material was 30 wt %, the tensile strength of the mixed matrix membrane was rapidly increased to 50% of that of the membrane not containing the hybrid nanoporous material.

Such a phenomenon is presumed by the fact that, when a small amount of the hybrid nanoporous material is added, hybrid nanoporous material are uniformly dispersed in a solution to make the polymer chain at the interface rigid, and thus the hybrid nanoporous material itself serves as a reinforcing material. However, when the content of the hybrid nanoporous material is increased to 30 wt %, hybrid nanoporous material are not easily dispersed, and the bonding of the hybrid nanoporous material and a polymer is not suitably performed, thereby rapidly decreasing the tensile strength thereof.

Experimental Example 5

Evaluation of Gas Permeation Performance of Mixed Matrix Membrane

The gas permeation characteristics of the mixed matrix membrane manufactured in Example 1 containing the hybrid nanoporous material MIL-100(Fe) were evaluated using a time-lag apparatus. First, a membrane was mounted in a permeation cell (15.89 cm$^2$) and reached a predetermined vacuum pressure using a vacuum pump, and then a gas to be measured was supplied at a predetermined pressure through a supply unit and simultaneously gas permeation rate was measured by a mass flow meter (MFM) connected with a permeation unit. Then, pressure change rate was measured by a pressure transduce, permeability and diffusivity were analyzed, and solubility was measured based these permeability and diffusivity. Permeability and selectivity were calculated by Equations 1 and 2 below.

$$\text{Permeability} = \frac{Q_p l}{A \Delta P} \quad \text{[Equation 1]}$$

-continued $$\alpha_{A/B} = \frac{P_A}{P_B} \quad \text{[Equation 2]}$$

In Equation 1, $Q_p$ represents a flow rate, t represents the thickness of membrane, A represents the effective area of membrane, $\Delta P$ represents the pressure difference between supply unit and permeation unit. Selectivity can be obtained by the ratio of permeability of single gas A to permeability of single gas B through Equation 2.

Barrer ($10^{-10}$ cm$^3$(STP)cm/(cm$^2$ sec cmHg)) unit was used in all of the gas permeability measured in the present invention, and only the ideal selectivity of single gas was considered as selectivity.

FIGS. 7 to 9 show the gas permeability and selectivity of the mixed matrix membrane according to the change in the additive amount of the hybrid nanoporous material. As shown in FIGS. 7 and 8, the permeability of gases other than $SF_6$ shows similar tendency. When the additive amount of the hybrid nanoporous material is 10 wt % or 20 wt %, the gas permeability of the mixed matrix membrane is lower than or equal to that of the polyimide membrane, and when the additive amount of the hybrid nanoporous material is 30 wt %, the gas permeability of the mixed matrix membrane is higher than that of the polyimide membrane. The hydrogen permeability of the mixed matrix membrane containing 30 wt % of the hybrid nanoporous material was increased by 14%, the carbon dioxide permeability thereof was increased by 9%, the methane permeability thereof was increased by 14%, the oxygen permeability thereof was increased by 31%, and the nitrogen permeability thereof was increased by 17%, compared to that of the polyimide membrane.

These results may be results caused by the gas permeation path of the mixed matrix membrane different from that of a conventional polymer membrane, and may be explained with reference to FIG. 10. (A) of FIG. 10 shows the gas permeation path of a pure polymer membrane, and (B) and (C) of FIG. 10 show the gas permeation paths of the mixed matrix membrane according to the content of the added hybrid nanoporous material.

As shown in (A) of FIG. 10, the conventional polymer membrane is configured such that gas molecules permeate through a space between polymer chains. However, in the mixed matrix membrane, when a relatively small amount of the hybrid nanoporous material is added, as shown in (B) of FIG. 10, various gas permeation paths exist, so that the tortuosity of the mixed matrix membrane is increased compared to that of the polyimide membrane, and the polymer chains become rigid at the time of the boding of the hybrid nanoporous material and the interface of a polymer to partially block the window of the hybrid nanoporous material, thereby decreasing the gas permeability. In contrast, in the mixed matrix membrane containing a relatively large amount of the hybrid nanoporous material, a large amount of the hybrid nanoporous material form new gas permeation paths, and the gas permeation through the hybrid nanoporous material becomes superior, thereby increasing the gas permeability. Consequently, the gas permeation rate according to the gas permeation path is increased in order of (B)<(A)<(C).

The permeability of $SF_6$ tends to be different from those of the above gases. That is, the permeability of $SF_6$ tends to be gradually decreased with the increase of the content of the hybrid nanoporous material. In the study in which the kinetic diameter of $SF_6$ was 5.5 Å, when it is considered that the window size of the used MIL-100(Fe) is 4.7 Å to 5.5 Å in a pentagonal shape and is 8.6 Å in hexagonal shape, it is observed that the permeability of $SF_6$ having a molecular size larger than the window size is decreased with the increase of the content of the hybrid nanoporous material.

As shown in FIG. 9, sine the tendencies of permeability of gases other than $SF_6$ are similar to each other, the results of selectivity also show tendencies similar to each other. In the case of the mixed matrix membrane containing 30 wt % of the hybrid nanoporous material, the selectivity of $CO_2/N_2$ was increased by 8.7%, the selectivity of $H_2/CO_2$ was increased by 5.3%, and the selectivity of $O_2/N_2$ was increased by 16.8%, compared to that in the case of the polyimide membrane. The selectivity of $N_2/SF_6$ was also increased with the increase of the content of the hybrid nanoporous material. In the case of the mixed matrix membrane containing 30 wt % of the hybrid nanoporous material, the selectivity of $N_2/SF_6$ was increased by about 40%.

Experimental Example 6

Analysis of Characteristics of Mixed Matrix Membrane Containing Core-shell Structured Hybrid Nanoporous Material The gas permeation path of the mixed matrix membrane manufactured in Example 1 containing the hybrid nanoporous material Al-MOF@PS prepared in Preparation Example 7 was schematically shown in FIG. 10(D).

As shown in FIG. 10(D), when the hybrid nanoporous material modified in the form of a core-shell structure, the gap or defect between the hybrid nanoporous material and the polymer membrane can be minimized, and the separation selectivity for specific gas can be increased The core-shell structured hybrid nanoporous material-polymer complex, that is, Al-MOF@PS was analyzed by an electron microscope. The results thereof are shown in Table 11. From FIG. 11, it can be ascertained that a core-shell structured complex was formed.

What is claimed is:
1. A polymer membrane capable of separating or concentrating a first gas or a second gas from a gas mixture including the first gas having a first monomolecular size V1 and the second gas having a second monomolecular size V2 (V1 ≠V2), the polymer membrane comprising:
   a polymer matrix; and
   particles of core-shell type hybrid nanoporous material dispersed in the polymer matrix, wherein the core-shell type hybrid nanoporous material comprises a hybrid nanoporous material as a core and a polymer acting as surfactant as a shell,
   wherein the polymer matrix in the polymer membrane permeates the first gas and the second gas at different rates,
   the hybrid nanoporous material has window size or adsorption characteristics for permeating the first gas, not the second gas, and
   wherein the content of particles of the core-shell type hybrid nanoporous material in the polymer membrane of gas separation or concentration is 30 wt % or more.
2. The polymer membrane of claim 1, wherein particles of the core-shell type hybrid nanoporous material are connected with each other to form a continuous channel, and thus the difference of permeation rate between the first gas and the second gas in the polymer membrane is larger than that of permeation rate between the first gas and the second gas in a polymer membrane in which hybrid nanoporous material are not dispersed.

3. The polymer membrane of claim 1, wherein the hybrid nanoporous material has a window size of 4 Å to 15 Å.

4. The polymer membrane of claim 3, wherein the gas to be separated or concentrated using the polymer membrane is selected from the group consisting of hydrogen, oxygen, nitrogen, carbon dioxide, methane, and sulfur hexafluoride ($SF_6$).

5. The polymer membrane of claim 1, wherein the polymer membrane is heat-treated or vacuum-treated.

6. A method of preparing a first gas or a second gas separated or concentrated from a gas mixture including the first gas having a first monomolecular size V1 and the second gas having a second monomolecular size V2 (V1 <V2) using a polymer membrane of claim 1 comprising a polymer matrix and particles of core-shell type hybrid nanoporous material dispersed therein,
wherein the polymer matrix in the polymer membrane permeates the first gas and the second gas at different permeation rates, and
the hybrid nanoporous material has window size or adsorption characteristics for permeating the first gas, not permeating the second gas.

7. The method of claim 6, wherein particles of the core-shell type hybrid nanoporous material is connected with each other to form a continuous channel, and thus the difference of permeation rate between the first gas and the second gas in the polymer membrane is larger than that of permeation rate between the first gas and the second gas in a polymer membrane in which hybrid nanoporous material are not dispersed.

8. A method of separating or concentrating a gas using the polymer membrane of claim 1, wherein one or more single gas of two gases is separated or concentrated from a gas mixture including two gases selected from the group consisting of $CO_2/N_2$, $H_2/CO_2$, $O_2/N_2$, and $N_2/SF_6$.

9. A method of separating or concentrating $SF_6$ from a gas mixture including $SF_6$ using the polymer membrane of claim 1.

10. A method of manufacturing the polymer membrane capable of gas separation or concentration according to claim 3, comprising the steps of:
dispersing a core-shell type hybrid nanoporous material in a solvent, the hybrid nanoporous material having a window size of 4 Å to 15 Å or having gas adsorption characteristics for a gas to be separated, which is different from those for other gases, to obtain a hybrid nanoporous material dispersion;
mixing the hybrid nanoporous material dispersion with a polymer to obtain a polymer solution; and
forming the polymer solution to obtain a polymer membrane.

11. The polymer membrane of claim 3,
wherein the polymer membrane is heat-treated or vacuum-treated.

12. A method of separating or concentrating a gas using the polymer membrane of claim 3, wherein one or more single gas of two gases is separated or concentrated from a gas mixture including two gases selected from the group consisting of $CO_2/N_2$, $H_2/CO_2$, $O_2/N_2$, and $N_2/SF_6$.

13. A method of separating or concentrating $SF_6$ from a gas mixture including $SF_6$ using the polymer membrane of claim 3.

14. The polymer membrane of claim 1, wherein the gas to be separated or concentrated using the polymer membrane is selected from the group consisting of hydrogen, oxygen, nitrogen, carbon dioxide, methane, and sulfur hexafluoride ($SF_6$).

* * * * *